United States Patent [19]

Fricke et al.

[11] 4,373,691

[45] Feb. 15, 1983

[54] DECOUPLING ARRANGEMENT FOR NON-INSULATED AC TRACK CIRCUITS IN RAILWAY SYSTEMS

[75] Inventors: Hans Fricke, Wolfenbüttel; Jürgen Kiess, Gerlingen; Lutz Schulmeyer, Stuttgart, all of Fed. Rep. of Germany

[73] Assignee: International Standard Electric Corporation, New York, N.Y.

[21] Appl. No.: 214,303

[22] Filed: Dec. 8, 1980

[30] Foreign Application Priority Data

Dec. 19, 1979 [DE] Fed. Rep. of Germany ....... 2951124

[51] Int. Cl.³ .............................................. B61L 12/06
[52] U.S. Cl. ................................................ 246/34 CT
[58] Field of Search ............... 246/34 R, 34 CT, 40, 246/51, 122 R, 129, 130, 187 R, 187 B, 28 P, 63 R; 179/82; 340/47

[56] References Cited

U.S. PATENT DOCUMENTS

Re. 27,472 9/1972 Thorne-Booth .............. 246/34 CT
4,304,377 12/1981 Pitard .......................... 246/34 CT

FOREIGN PATENT DOCUMENTS 1265186 4/1968 Fed. Rep. of Germany .
2053897 4/1972 Fed. Rep. of Germany .
1326885 8/1973 United Kingdom .......... 246/34 CT

OTHER PUBLICATIONS

Dewald: "Tonfrequenz-Gleisstromkreise", *Signal and Draht 71, (1979), 5, pp. 94-100.*

Primary Examiner—Thomas A. Robinson
Attorney, Agent, or Firm—John T. O'Halloran; Alfred C. Hill

[57] ABSTRACT

A decoupling arrangement for non-insulated track circuits is disclosed wherein the receiving circuit of the evaluating unit for the AC track currents is electrically separated from the traction-current-carrying parts of the track. The cross bonds between the two rails of a track may be shorting bonds or so-called S bonds. The arrangement according to the invention improves the tuning behavior of the track circuit receivers considerably.

9 Claims, 10 Drawing Figures

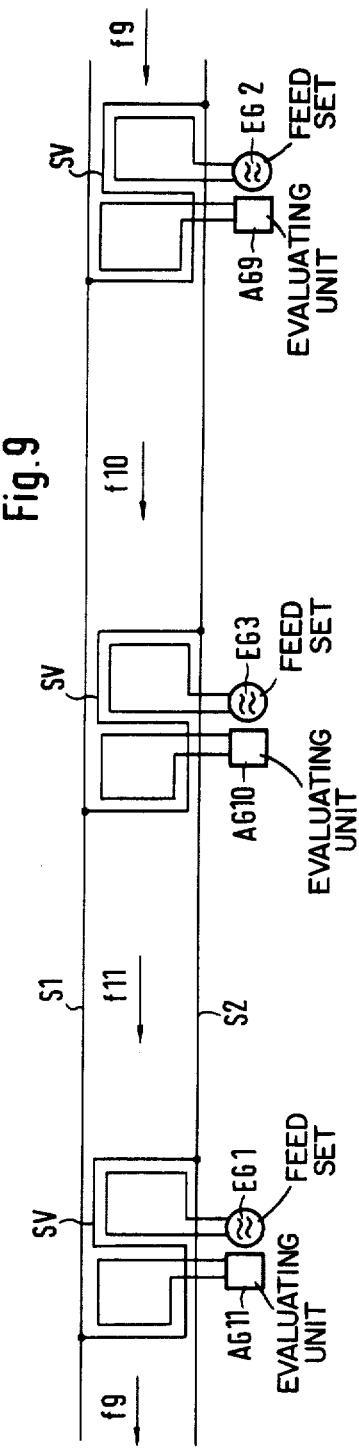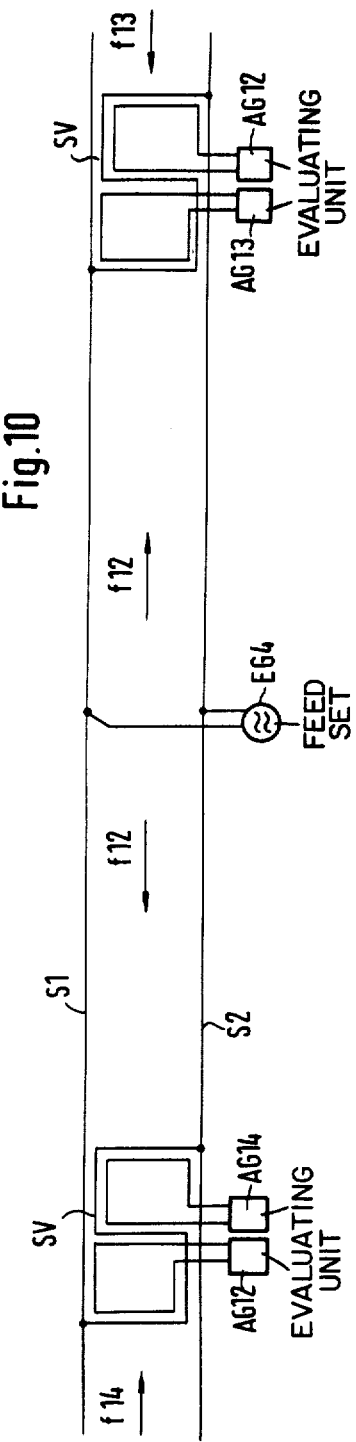

DECOUPLING ARRANGEMENT FOR NON-INSULATED AC TRACK CIRCUITS IN RAILWAY SYSTEMS

The present invention relates to a decoupling arrangement for non-insulated AC track circuits in railway systems. Such decoupling arrangements are used in railway systems with continuous welded rail and permit the formation of jointless track circuits for determining unoccupancy and occupancy of track sections.

BACKGROUND OF THE INVENTION

Various decoupling arrangements are known from "Signal & Wire", 71 (1979) 5, pages 94 to 100. They basically consist of two parallel resonant circuits tuned to different frequencies which usually operate as a transmitting circuit and a receiving circuit, respectively. The cross bonds interconnecting the rails serve as compensating elements for the traction power return. If a number of such decoupling arrangements are disposed in the track at predetermined intervals, the transmitting circuit of each decoupling arrangement will work into the receiving circuit of the next decoupling arrangement. In this manner, a chain of adjoining track circuits is obtained, which makes it possible to monitor the track for unoccupancy and occupancy nearly without a gap. Each axle which is located between two decoupling arrangements and short circuits the two rails of the track will be detected by a fall of the voltage in the receiving circuit of the next decoupling arrangement below a predetermined threshold value due to the short circuit. Only if simple shorting bonds are used as cross bonds will narrow monitoring gaps remain in the immediate vicinity of the cross bonds, where a single axle will not be detected.

The inductances in the parallel resonant circuits of the decoupling arrangements are provided by parts of the rails and of the cross bonds, while the capacitances are provided by capacitors which are located outside the track in so-called tuning units and are connected to given points of the rails and/or of the cross bonds via separate leads.

These known arrangements have the disadvantage of necessitating critical tuning in the track and, consequently, showing an extremely complicated tuning behavior. Also, subsequent detuning of the resonant circuits is quite possible and greatly affects the curves showing the influence exerted by passing axles.

The object of a decoupling arrangement of the above kind is to permit an electrical division of a continuous welded track into track sections and fail-safe monitoring of these track sections for unoccupancy and occupancy.

SUMMARY OF THE INVENTION

The absence of a low-impedance electrical connection between the traction power return path (rails, cross bond) and the receiving circuit of the decoupling arrangement, and of the evaluating circuit connected to the receiving circuit permits considerably simpler and more reliable tuning of the receiving circuit. The unwanted coupling between the transmitting circuit and the receiving circuit can be largely eliminated, particularly if the transmitting circuit is isolated from the traction current path. Another big advantage is gained by the fact that the coupling between the track circuit and the receiving circuit can be diminished, thus reducing the influence of the short circuit by the axle on the fall in voltage sensed by the evaluating circuit to the point that—after suitable signal amplification—this fall in voltage is no longer due only to the axle short circuit as in the prior art but for a considerable part also to eddy-current losses in the chassis of the passing vehicles. This division of the influences makes the evaluation less sensitive to variations of the axle short circuit due to dirt or ice on the rails. In addition, the above-mentioned narrow monitoring gaps in the case of decoupling arrangements with straight shorting bonds can be eliminated by such a division.

In a number of embodiments, the cross bond is a shorting bond. This results in a straightforward design and keeps wiring costs low. The safety of the track occupancy indication is ensured, particularly if vehicles with defined axle base are used.

Other combinations of conductor loops with one shorting bond are also described. These combinations are suitable both for feeding alternating currents into the rails and for coupling them therefrom. With these combinations, the action of the vehicle chassis can be sensed in a very simple manner to avoid a monitoring gap in the region of the cross bond.

The present invention also relates to the use of a so-called S bond as a cross bond. With this type of bond, a genuine overlap of the curves showing the influence exerted on track circuits located on both sides of the decoupling arrangement is achieved even without utilizing the influence exerted by the vehicle chassis. The separation between the traction-current-carrying track circuit and the conductor loop acting as a receiving circuit and connected to the evaluating circuit permits simple and exact tuning to the frequency to be evaluated. If transmitting and receiving loops separated from the track circuit are used together with an S bond, the coupling between the transmitting circuit and the receiving circuit of the decoupling arrangement can be reduced to the point that its disturbing influence during the tuning of the receiving circuit is nearly eliminated.

The present invention also provides for magnetic coupling into and/or from the rails by means of coupling coils which are used together with an S bond instead of conductor loops. Since the coupling coils are attached to the track at points where the track currents of the respective unwanted frequency flow in opposite directions in the rail and in the S bond running close to the rail, and thus compensate each other, there is no cross coupling between the transmitting circuit and the receiving circuit of such a decoupling arrangement.

BRIEF DESCRIPTION OF THE DRAWINGS

Embodiments of the arrangement according to the invention will now be described with reference to the accompanying drawings, in which:

FIGS. 9 and 10 show track circuits with decoupling arrangements according to the invention.

DESCRIPTION OF THE PREFERRED EMBODIMENTS

Figure 1:
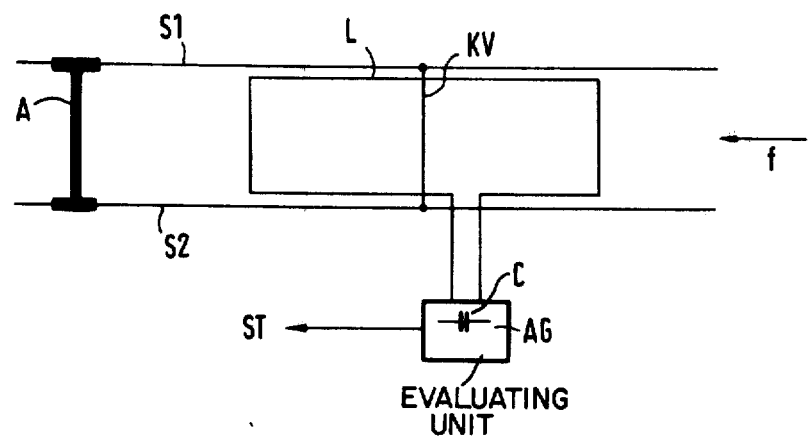
FIGS. 1 to 5 show possible forms of conductor loops laid together with a shorting bond, FIG. 3 including influence curves.

FIG. 1 shows a conductor loop L, which is laid between two rails S1, S2 of a track in the immediate vicinity of a shorting bond KV interconnecting the rails by the straight path, and is connected to an evaluating unit AG located outside the track. The unit AG evaluates an alternating voltage with a frequency f, which is induced in the conductor loop, as a result of inductive coupling between the track circuit and the conductor loop, by a track current flowing in the track circuit on the right-hand side of the shorting bond KV, which circuit is formed by the rails S1 and S2 and the shorting bond KV. The track current is fed into the rails at a point not shown in the figure. The evaluating unit contains essentially a capacitance C, which is required for tuning the conductor-loop circuit to the frequency f to be received, and a threshold switch as a receiver which, depending on the magnitude of the voltage induced in the conductor loop, indicates the track section monitored by the conductor loop as unoccupied or occupied via an interlocking-station line ST. In addition, the evaluating unit contains further tuning means, e.g. variable capacitances or variable inductances for tuning the conductor-loop circuit to resonance, which, together with the capacitance C, form a so-called tuning unit.

An axle A passing along the track from the left to the right influences the conductor-loop circuit in different ways: Together with the rails and the shorting bond KV, it forms a low-impedance closed circuit which, acting as a shunt "short-circuit winding", damps the conductor-loop circuit. Depending on the degree of coupling between track circuit and conductor loop, this influence results in a greater or smaller decrease of the voltage in the conductor-loop circuit. This voltage decrease increases as the axle A approaches the conductor loop, and becomes greatest when the axle has reached the left boundary of the conductor-loop. As the axle continues to move toward the right, the voltage decrease becomes smaller again until it reaches zero when the axle is on a level with the shorting bond.

The voltage decrease would occur symmetrically on the right-hand side of the shorting bond if the conductor loop, instead of being supplied from the track circuit located on the right of the decoupling arrangement as in FIG. 1, were fed independently of the track circuit.

In the case shown in FIG. 1, after the axle has passed over the shorting bond, a different kind of influence is exerted which results in a large voltage decrease in the conductor-loop circuit and exceeds the influence described above. This is the reduction of the inductive coupling between the conductor loop and the track circuit feeding the loop as the overlap between the track-circuit area and the area bounded by the conductor loop is decreased by the axle short circuit. When the axle A is on the right-hand side of the shorting bond KV, the track current flows no longer through the shorting bond but through the axle A, which is closer to the feed point. The portion of the track circuit located on the left of the axle A remains nearly dead and no longer contributes to the coupling between the track circuit and the conductor loop. As the axle proceeds to the right, the overlap area and, consequently, the coupling between the feeding track circuit and the conductor loop decrease until there is no coupling at all after the axle has left the right-hand boundary of the loop, and the voltage in the conductor-loop circuit decreases to zero. Only when the axle has passed the feed point of the track circuit will the track current and the voltage reappear in the conductor-loop circuit.

A third kind of influence on the voltage sensed by the evaluating unit is exerted by the chassis of the vehicles connected with the passing axles. Eddy-current losses occur in the metallic parts of the vehicle chassis. The higher the track frequency, the greater these losses will be, and they also cause a voltage decrease in the conductor-loop circuit which is superimposed on the voltage decreases caused by the other kinds of influence mentioned above.

If the coupling between the track circuit and the conductor loop is reduced, e.g. by increasing the distance between the respective rail and the conductor-loop cable, the relative share of the eddy-current losses in the voltage decrease in the conductor-loop circuit will increase, and a signal will be obtained which is based partly on the action of axles and partly on the action of chassis, and which, while being weaker than the signal received in case of close coupling between track circuit and conductor loop, can be amplified so as to be suitable for evaluation.

The arrangement shown in FIG. 1 can also be used as a transmitting circuit for inductively feeding track current into the track circuits located on both sides of the shorting bond. The evaluating unit AG is then replaced by a feed set which contains, in addition to a tuning unit consisting of a tuning capacitance and further tuning means, an alternating-current generator with a low-impedance output. It is also possible to house the receivers contained in the evaluating units and the alternating-current generators contained in the feed sets separately from the tuning units, e.g., to put them in the interlocking station, and to connect them to the wayside tuning units via cables.

Figure 2:
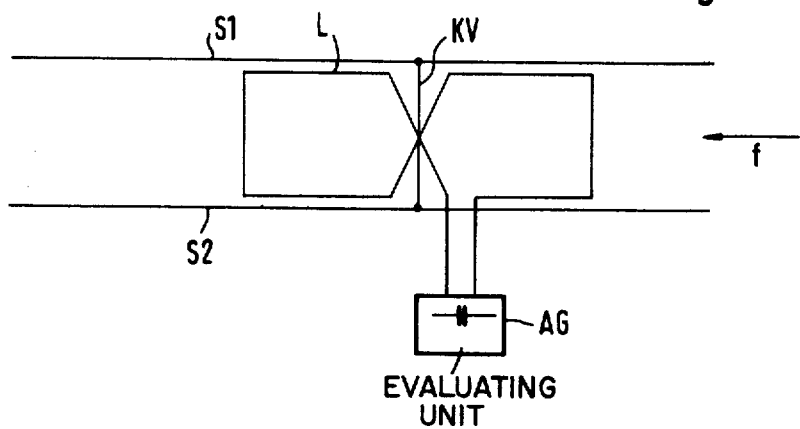
Figure 3:
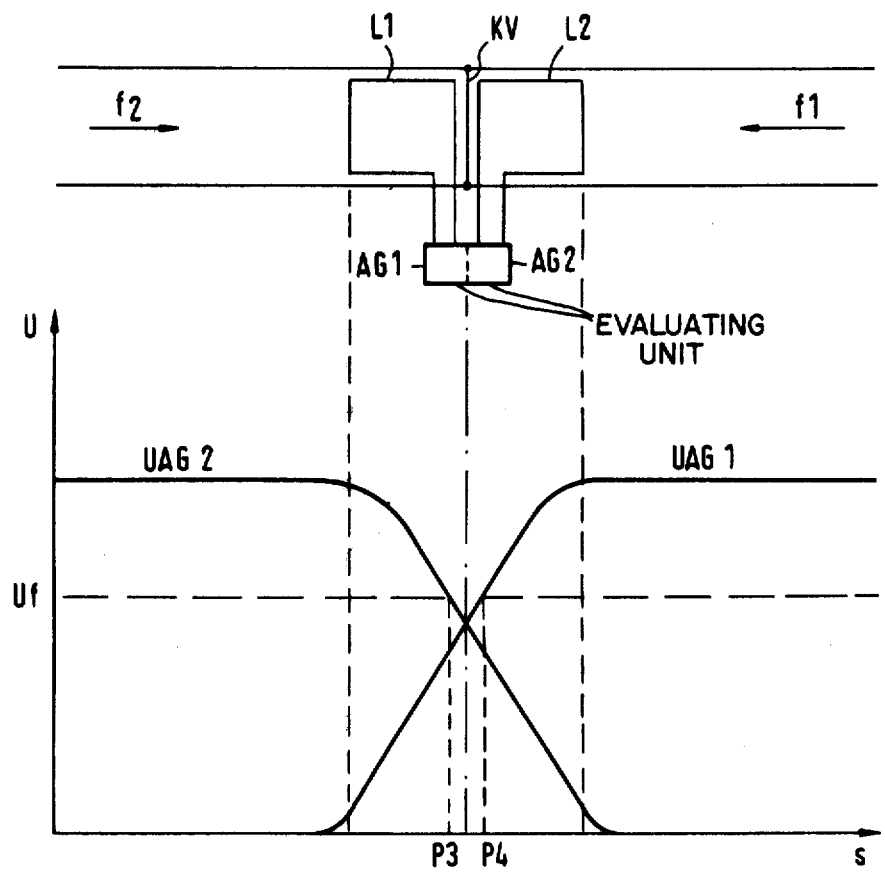

FIG. 2 shows a conductor loop transposed in the middle. Influence is exerted in the same manner as with the arrangement shown in FIG. 1, but the two partial loops are influenced in phase opposition. FIG. 3 shows an arrangement with two conductor loops L1 and L2, each of which are associated with a different one of evaluating units AG1 and AG2 and receive different track frequencies f1 and f2. FIG. 3 also shows the variation of the loop voltages UAG1 and UAG2 with the location S of an axle connected with the vehicle, so-called influence curves. Here, the loop voltage UAG2 falls below the voltage Uf, required for an "unoccupied" indication by the track circuits on the left- and right-hand sides of the shorting bond KV, at a point P3, i.e., the right-hand track circuit, monitored by the loop L2, is indicated as occupied just in time before the track circuit located on the left of the shorting bond and monitored by the loop L1 is indicated as unoccupied (rise of the loop voltage UAG1 above the voltage Uf at a point P4). There may be a monitoring gap if the action of the vehicle chassis is not included (point P4 on the left of point P3).

Figure 4:
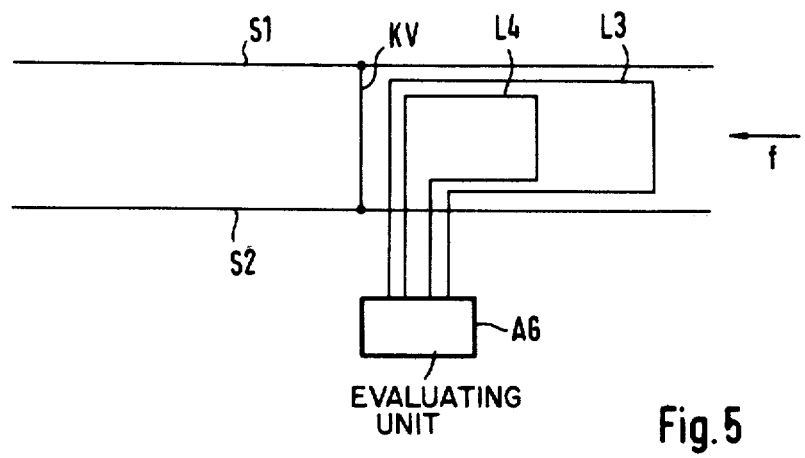
Figure 5:
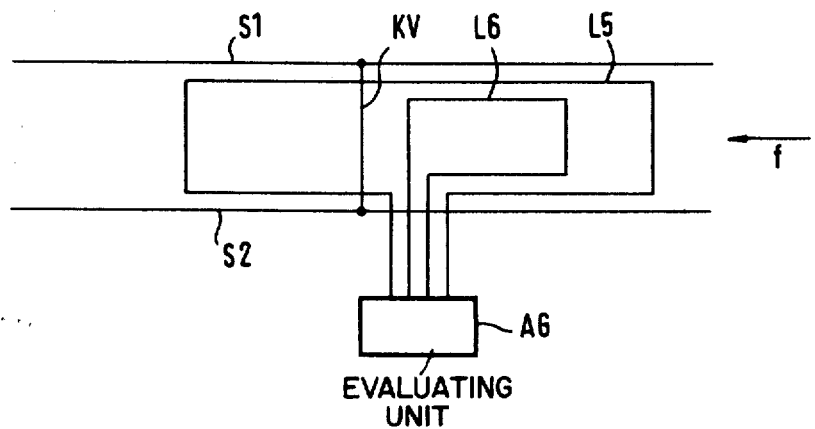

FIGS. 4 and 5 show possible conductor-loop combinations, L3, L4 and L5, L6, with which a finer resolution of the influence curves can be achieved.

Figure 6:
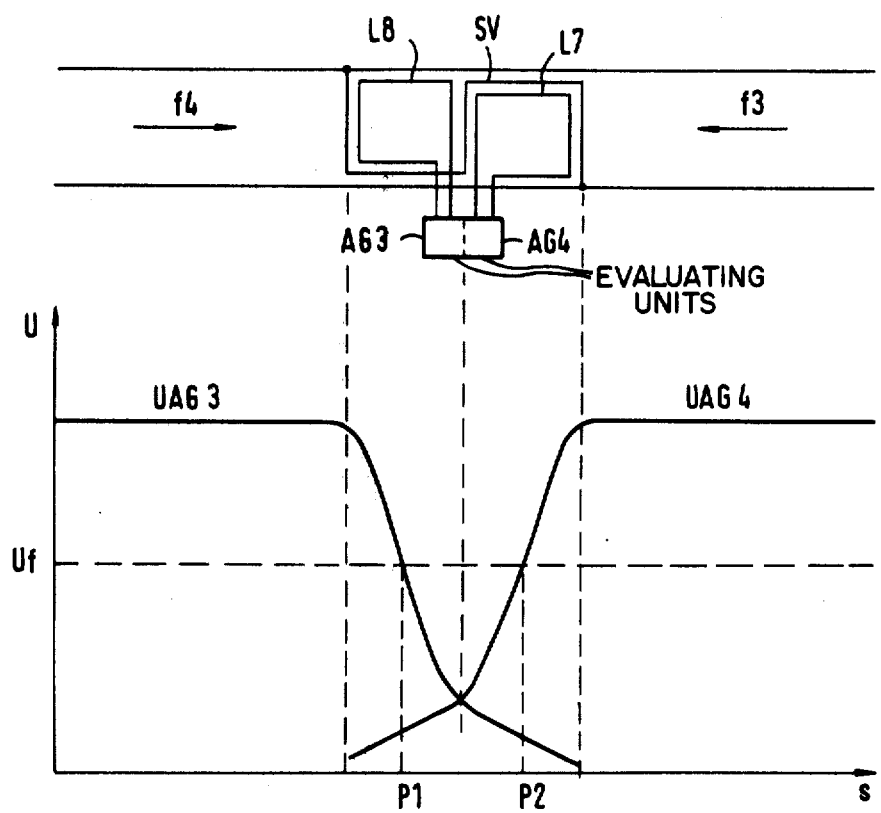
FIGS. 6 and 7 show conductor loops in combination with an S bond, FIG. 6 including influence curves.

FIG. 6 shows a combination of two conductor loops L7 and L8 with a so-called S bond SV. The loop L8 is tuned to a frequency f3, assigned to the track circuit on the right-hand side of the S bond, and the loop L7 is tuned to a frequency f4, assigned to the track circuit on the left-hand side of the S bond. Both loops are connected to separate evaluating (or tuning) units AG3 and AG4, which are advantageously housed in a common case. FIG. 6 also illustrates the shapes of the loop voltages (influence curves) for the arrangement shown. There is a distinct overlap zone (region between point P1 and P2) in which both evaluating units AG3, AG4 provide an "occupied" indication. While this overlap behavior does not appreciably differ from that of a prior art decoupling arrangement with an S bond, the tuning behavior of the arrangement according to the invention is much better than that of the prior art arrangement. Asymmetries in the traction power return are hardly noticeable since the conductor-loop circuits, which are electrically separated from the track circuits, can be tuned highly selectively. If electrically separated conductor loops are used, the cross coupling between the circuits on both sides of the S bond—this cross coupling complicates the tuning in prior art arrangements—is so small as to be no longer disturbing, even if the loops are spaced only a small distance apart. An axle approaching a track circuit limited by the arrangement of FIG. 6 does not influence the receiving circuit until it has passed over the beginning of the S bond, no matter whether the loops on the right- and left-hand sides of the S bond are both connected as receiving circuits or whether one of the loops is used as a transmitting circuit for feeding alternating current into the rails.

FIG. 9 shows track circuits which are limited by decoupling arrangements consisting of S bonds and conductor loops. Feed sets EG1, EG2 and EG3 supply the track circuits with alternating currents of the frequencies f9, f10 and f11 via the conductor loops associated with them. Evaluating units AG9, AG10 and AG11 monitor the track circuits for unoccupancy and occupancy with the aid of their conductor loops. A transmitting circuit, consisting of a feed set and conductor loop, a receiving circuit, consisting of an evaluating unit and conductor loop, and an S bond SV form a decoupling arrangement.

In FIG. 10, the decoupling arrangements consist of an S bond and two receiving circuits. The alternating current is fed directly into the track circuit in the middle of the track section between two decoupling arrangements.

Figure 7:
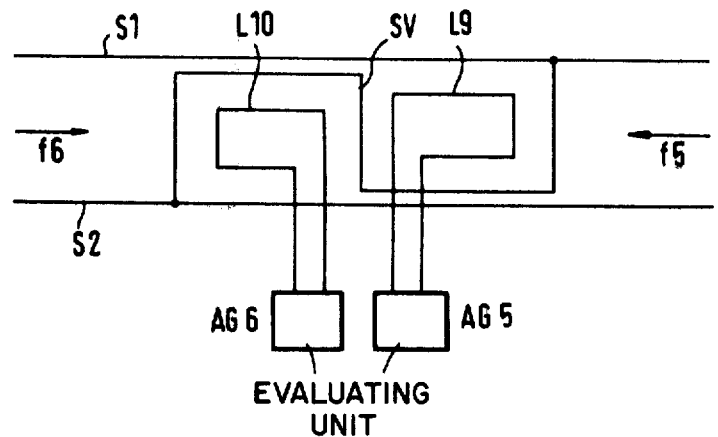
Figure 8:
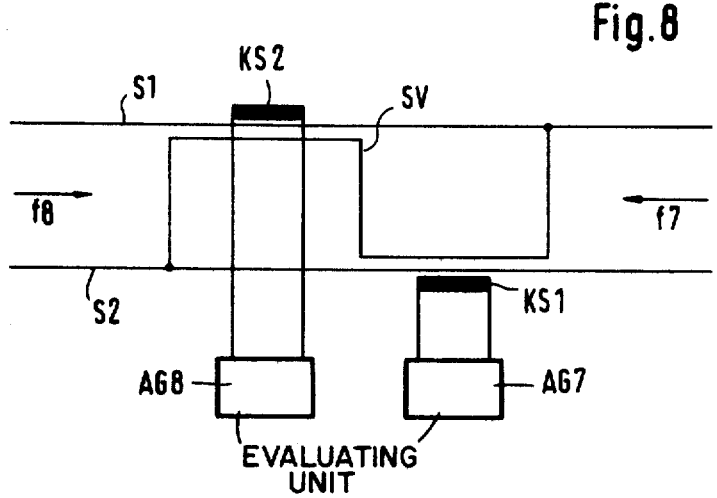
FIG. 8 shows a decoupling arrangement with an S bond and coupling coils.

In the case of the decoupling arrangement shown in FIG. 7, the conductor loops L9 and L10 are considerably smaller than those of the decoupling arrangement of FIG. 6. This is to prevent any cross coupling between the conductor-loop circuits. The decoupling arrangement shown in FIG. 8 serves the same purpose. Instead of conductor loops, it uses coupling coils which are disposed at those points of the decoupling arrangement where the S bond and a rail run close together. At these points, the track currents of the track circuits on both sides of the decoupling arrangement flow through the S bond and the rail in opposite directions. It therefore induces no voltage in the coupling coil and does not interfere with the evaluation of the voltage induced by the track current of the other track circuit.

We claim:

1. A decoupling arrangement for non-insulated AC track circuits in a railway system comprising:
    a short circuiting cross bond connected between both rails of a track of said railway system;
    at least one conductor loop disposed between said rails in the immediate vicinity of said cross bond and inductively coupled to said cross bond and to portions of said rails adjacent said cross bond to perform one of the following two operations (1) feed alternating current having a predetermined frequency into said rails or (2) couple said alternating current from said rails.

2. A decoupling arrangement as claimed in claim 1, wherein said cross bond electrically interconnects said two rails by the shortest path.

3. A decoupling arrangement as claimed in claim 2, wherein said conductor loop includes two portions running parallel to said track and two portions at right angles to said track disposed such that approximately half of the area bounded by said conductor loop is on one side of said cross bond, while the other half is on the other side of said cross bond.

4. A decoupling arrangement as claimed in claim 3, wherein said conductor loop is transposed at said cross bond.

5. A decoupling arrangement as claimed in claim 2, wherein two independent conductor loops are provided each including two portions running parallel to said track and two portions at right angles to said track disposed such that one of the areas bounded by said two conductor loops is on one side of said cross bond, and the other area bounded by said two conductors is on the other side of said cross bond.

6. A decoupling arrangement as claimed in claim 5, wherein one of said two conductor loops is disposed within the area bounded by the other of said two conductor loops.

7. A decoupling arrangement as claimed in claim 1, wherein said cross bond includes portions running alternately at right angles and parallel to said track in the manner of a so-called S bond, said portions parallel to said track being disposed close to an associated one of said rails, said cross bond forming two partial loops which are open in opposite directions.

8. A decoupling arrangement as claimed in claim 7, wherein two independent conductor loops are provided each including two portions running parallel to said track and two portions at right angles to said track disposed such that each of the two areas bounded by said two conductor loops lies within an associated one of said two partial loops formed by said cross bond.

9. A decoupling arrangement according to claim 7, wherein said two conductor loops are coupling coils disposed in the immediate vicinity of those portions of said S bond running parallel to said track.

* * * * *